(12) United States Patent
Kunz

(10) Patent No.: US 12,193,909 B2
(45) Date of Patent: *Jan. 14, 2025

(54) DENTAL IMPLANT

(71) Applicant: STRAUMANN HOLDING AG, Basel (CH)

(72) Inventor: Marcel Kunz, Basel (CH)

(73) Assignee: STRAUMANN HOLDING AG, Basel (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/519,818

(22) Filed: Nov. 27, 2023

(65) Prior Publication Data

US 2024/0081957 A1 Mar. 14, 2024

Related U.S. Application Data

(63) Continuation of application No. 16/956,933, filed as application No. PCT/EP2018/000576 on Dec. 20, 2018, now Pat. No. 11,857,390.

(30) Foreign Application Priority Data

Dec. 20, 2017 (DE) .......................... 202017107752.7

(51) Int. Cl.
*A61C 8/00* (2006.01)

(52) U.S. Cl.
CPC .......... *A61C 8/0037* (2013.01); *A61C 8/0089* (2013.01); *A61C 8/0087* (2013.01)

(58) Field of Classification Search
CPC ... A61C 8/0037; A61C 8/0089; A61C 8/0087; A61C 8/0018

(Continued)

(56) References Cited

U.S. PATENT DOCUMENTS

| 3,675,328 A | 7/1972 | Weissman |
|---|---|---|
| 2007/0009854 A1 | 1/2007 | Morgan |

(Continued)

FOREIGN PATENT DOCUMENTS

| BR | PI0902546 A2 | 5/2011 |
|---|---|---|
| CN | 101198291 A | 6/2008 |

(Continued)

OTHER PUBLICATIONS

Ihde Stefan Dr, Implant With Handle, EP 0963738 A1, Machine translation (Year: 1999).*

(Continued)

*Primary Examiner* — Ralph A Lewis
*Assistant Examiner* — Mirayda A Aponte
(74) *Attorney, Agent, or Firm* — Oliff PLC

(57) ABSTRACT

A dental implant with an implant extension that are formed along a longitudinal axis. The dental implant has apical and coronal ends and a section for receiving and securing an abutment. The implant extension is formed in one piece with the implant and extends away from an end face of the apical end along the longitudinal axis. The implant extension has a first section along the longitudinal axis with an annular constriction directly connected to the apical end face of the implant. The implant breaks off from the implant extension at the constriction. The second section and splined shaft section are arranged along the longitudinal axis following the first section so as to be further away from the implant than the first section. The second section includes an outer annular groove that is designed to be clamped in the direction of the longitudinal axis to hold the implant extension.

20 Claims, 6 Drawing Sheets

(58) Field of Classification Search
USPC .................. 433/174–176, 201.1; 206/63.5
See application file for complete search history.

(56) References Cited

U.S. PATENT DOCUMENTS

| | | | |
|---|---|---|---|
| 2007/0287129 A1* | 12/2007 | Ihde | ............ A61C 8/001 606/916 |
| 2009/0065387 A1 | 3/2009 | Bammerlin et al. | |
| 2012/0181202 A1 | 7/2012 | Guenter et al. | |

FOREIGN PATENT DOCUMENTS

| | | |
|---|---|---|
| CN | 101966103 A | 2/2011 |
| CN | 102056566 A | 5/2011 |
| CN | 211156383 U | 8/2020 |
| DE | 202006005321 U1 | 8/2007 |
| EP | 0963738 A1 * | 12/1999 ............ A61C 8/00 |
| EP | 1839617 A1 | 10/2007 |
| EP | 2279708 B1 | 5/2013 |
| JP | 2005-528953 A | 9/2005 |
| JP | 2013-500093 A | 1/2013 |
| WO | 2011/113568 A1 | 9/2011 |
| WO | 2017/191925 A1 | 11/2017 |
| WO | 2017/207434 A2 | 12/2017 |

OTHER PUBLICATIONS

Apr. 9, 2019 International Search Report issued in International Patent Application No. PCT/EP2018/000576.
Jul. 20, 2021 Office Action issued in Chinese Patent Application No. 201880089578.5.
Ihde, EP 1839617, Oct. 2007, Screw Implant specification translation (Year: 2007).
Ihde, EP 0963738, Jun. 1998, Implant with handle specification translation (Year: 1998).
Jan. 10, 2023 Office Action issued in Japanese Patent Application No. 2020-534606.

* cited by examiner

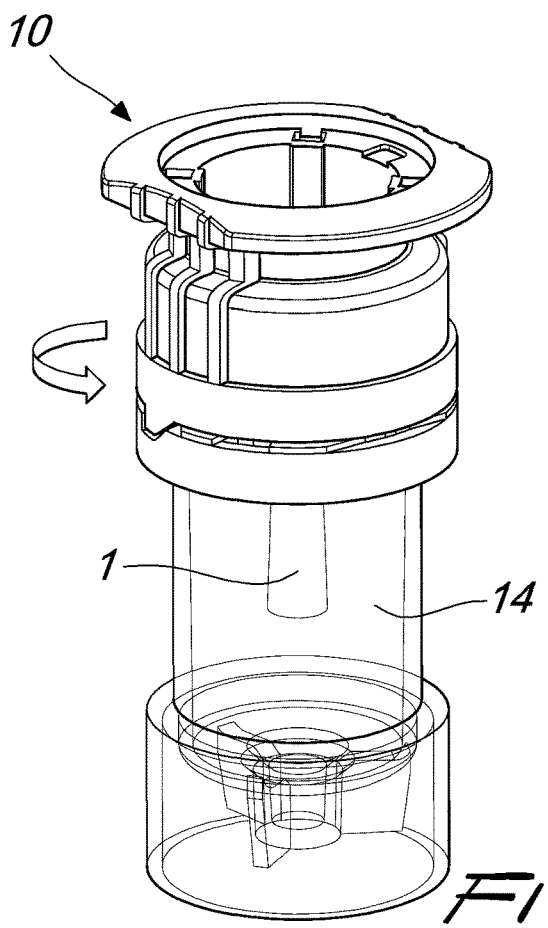
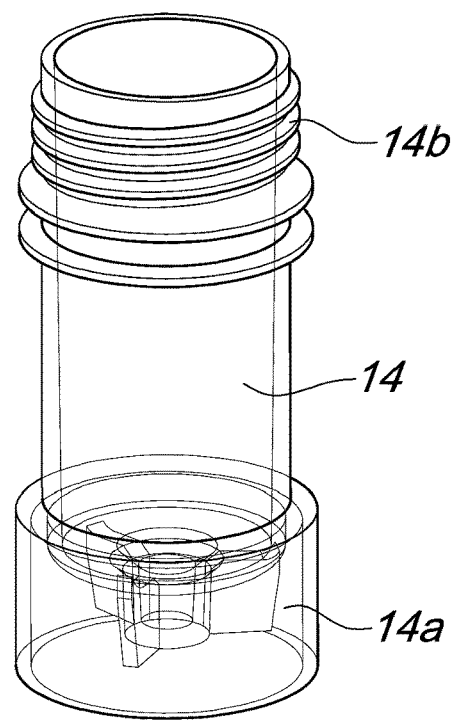
Fig. 3a
Fig. 3b
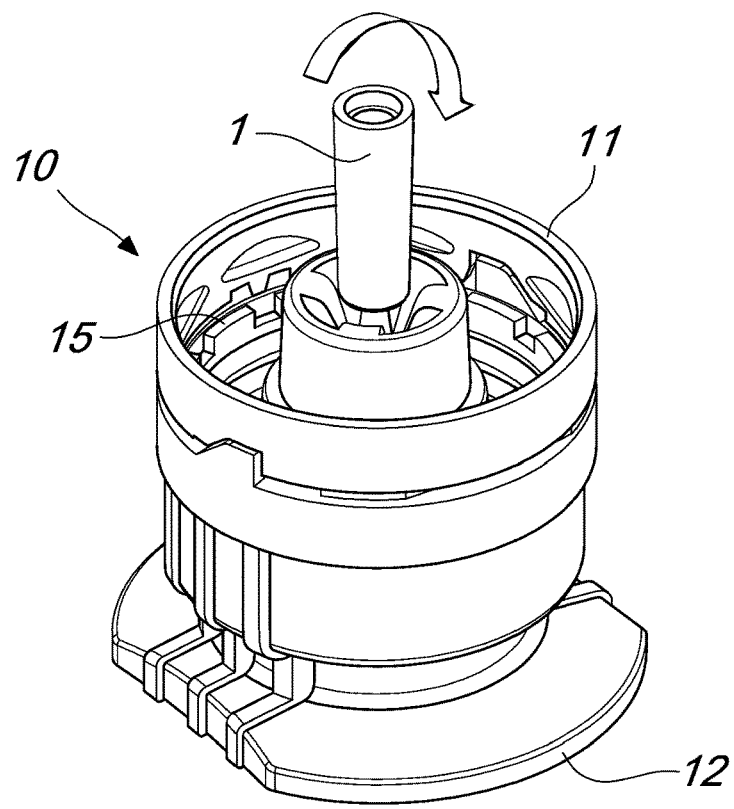
Fig. 3c

DENTAL IMPLANT

This is a Continuation of application Ser. No. 16/956,933 filed Jun. 22, 2020, which in turn is a national phase of PCT/EP2018/000576 filed Dec. 20, 2018, which claims the benefit of DE 202017107752.7 filed Dec. 20, 2017. The disclosure of the prior applications is hereby incorporated by reference herein in its entirety.

The present invention relates to a dental implant with a separable implant extension. The present invention also relates to a method and a use.

Dental implants must be transported from the manufacturer to the respective treating physician in such a way that they arrive there safe and undamaged and under no circumstances contaminated or damaged in any way. Special receptacles have been developed as packagings for this purpose, such as those disclosed in EP2279708B1. In the prior art, the respective dental implant is usually held clamped for this purpose at the coronal end, which is connected to an abutment after an implantation, wherein the implant is held at the apical end against a stop in the packaging receptacle or receptacle. The packagings of the dental implants, or in short receptacles, are often complex and expensive. It can also happen in isolated cases that the apical end of the dental implant comes into contact with a plastic and rubs against it during transport, so that plastic particles can deposit on the dental implant.

EP2279708B1 discloses a receptacle with an adapter in which the dental implant is clamped and with which the dental implant can be removed from the receptacle and then taken out of the adapter. Safe insertion and removal of a dental implant into and from the receptacle is often problematic.

In general, the dental implant should be both easy to insert into the receptacle and to remove from it without causing the physician any trouble or the implant even jumping or falling out of the hand when removing it from the receptacle. The removal of the dental implant from the receptacle is usually done by holding the dental implant at the coronal end, which is primarily designed to engage with the abutment, and pulling it out of the receptacle or a cover thereof.

EP0963738A1 discloses to form the dental implant with an apical-side implant extension which is formed firmly and in one piece with the dental implant and is firmly seated in a head piece of the receptacle. For removal, the dental implant is designed with a predetermined breaking point between the actual dental implant and the implant extension in such a way that the predetermined breaking point for removal of the dental implant from the cover can be separated easily enough by hand by a rotary and/or buckling movement. In this way, the apical end of the dental implant does not come into contact with any other material than itself and, as the case may be, with a surrounding liquid. For example, the head piece of the receptacle is glued to the implant extension in order to be able to separate the implant from the head piece. However, gluing the dental implant to the head piece is considered problematic, as adhesive could get onto the dental implant or, if stored in liquid, into the liquid.

EP 1839617A1 describes a screw implant with an end section which, for certain applications, can be separated from a foot section of the screw implant via a predetermined breaking point, wherein the end section has a rotationally symmetrical, profiled surface structure, preferably a saw tooth profile. The end section known from EP 1839617A1 is primarily intended to remain with the implant to promote permanent and firm seating of the implant in the jawbone.

The object of the invention, in order to remediate the disadvantages arising from the prior art, therefore consists in providing a dental implant which can be inserted as easily as possible in a receptacle provided for it for transport and can also be removed from it again, with the lowest possible risk of contamination of the dental implant to be implanted.

The above object is solved by a dental implant as disclosed and claimed herein. The above object is also solved by a method for transporting an apically held dental implant and by a use as disclosed and claimed herein.

Further advantageous embodiments of the invention are set forth in the dependent claims.

According to the invention there is provided a dental implant with an implant extension which are formed along a longitudinal axis, wherein:
 a) the dental implant comprises an apical end, a coronal end and a section for receiving and securing an abutment;
 b) the implant extension is formed in one piece with the implant and extends away from an end face of the apical end along the longitudinal axis,
 c) wherein the implant extension has a first section along the longitudinal axis with an annular constriction which is directly connected to the end face of the apical end of the implant and is designed as a predetermined breaking point with such a small material diameter that, in the event of bending or torsion of the implant against the implant extension, the implant breaks off from the implant extension at the constriction,
 d) wherein according to the invention the implant extension has a second section and a splined shaft section along the longitudinal axis following the first section, wherein the second section and the splined shaft section being further away from the implant than the first section,
 e) the second section has therein, perpendicular to the longitudinal axis, an outer annular groove being designed to hold the implant extension by clamping the groove in the direction of the longitudinal axis, and
 f) wherein the splined shaft section is designed to hold the implant extension in a secured manner against rotation around the longitudinal axis.

The groove makes it advantageously possible for the dental implant to be inserted by the implant extension into a matching channel in a cover of a receptacle intended for the dental implant and to be held therein by the groove along the longitudinal axis. In this way the receptacle, which is a transport receptacle for the dental implant and comprises for example the cover and a matching bottom receptacle, can be easily formed, wherein the dental implant has to be connected to the cover firmly enough only once, in order to allow to separate the dental implant easily when the same is removed from the receptacle and from the cover. The channel can, for example, be designed so stable that the dental implant can be broken off from the implant extension by a bending moment, wherein the groove only needs to ensure that a spring arm or holding elements engaging therein hold the dental implant sufficiently firmly during transport along the longitudinal direction, so that the same does not fall out of the channel. In addition, after separation from the implant, the implant extension is held in the cover or prevented from falling out of the cover.

Preferably and advantageously, the groove may include at least one edge that forms a barb function with the holding element or spring arm of the cover of the receptacle. In this way, the dental implant can be inserted into the cover in the longitudinal direction with little longitudinal force and still be firmly fixed in the longitudinal direction without being pulled out again, or only with much greater force. This means that the dental implant can then be safely broken off when removing it from the cover or from the implant extension in the cover.

The splined shaft section formed in the implant extension ensures advantageously that the implant extension is held in the cover stable and safe against rotation in order to be able to apply a torsion to the implant at the predetermined breaking point and thus to be able to break off or twist off it.

Preferably and advantageously, the material diameter of the constriction is between 0.4 mm and 0.8 mm or between 0.8 mm and 1.2 mm or more preferably it is less than 1.0 mm or less than 0.7 mm or less than 0.6 mm.

Preferably and advantageously, the material diameter and a material of the constriction are designed and selected in such a way that the constriction breaks at a torsion of less than 25 Ncm or less than 20 Ncm or more preferably less than 10 Ncm or even more preferably less than 5 Ncm.

Preferably and advantageously, the constriction is designed in such a way that the material diameter of the first section increases continuously along the longitudinal axis beginning at the end face of the apical end of the implant.

Preferably and advantageously, the material diameter of a first partial section of the first section of the implant extension, which is directly adjacent to the end face of the apical end, has an inclination relative to the longitudinal axis of less than 35° and preferably 31° to 25°.

Preferably and advantageously, the dental implant has threads between the apical end and the coronal end for screwing the dental implant into a bone.

According to the present invention, it is particularly advantageous that the implant extension can be separated without or only with a very slight splintering of the implant body. In particular, according to the invention, the geometry of the apical implant end can remain practically unchanged after the separation of the implant extension, since any changes are essentially limited to the circular constriction.

Preferred embodiments according to the present invention are illustrated in the following drawings and in a detailed description, but they are not intended to limit the present invention exclusively to these embodiments.

Figure 4:
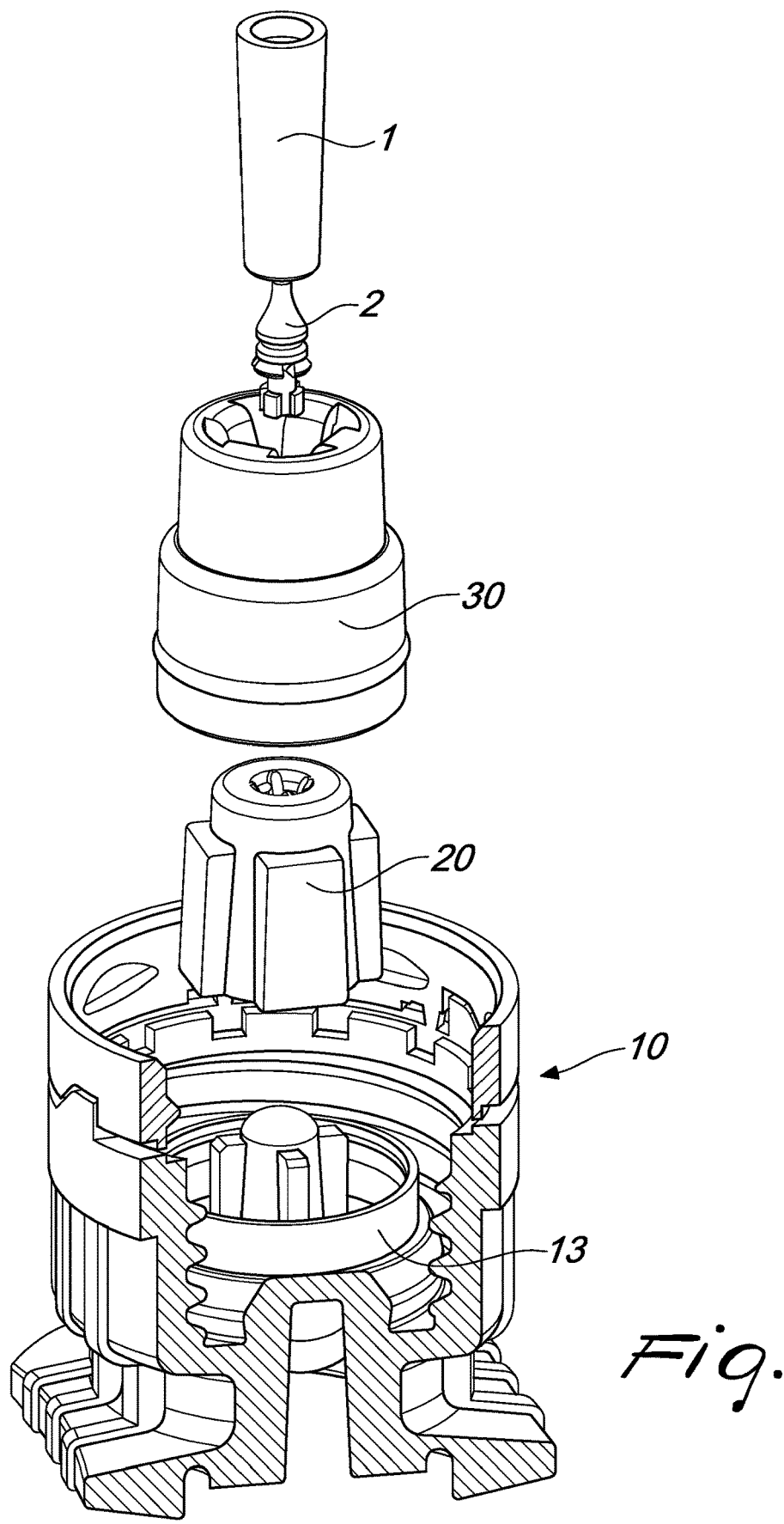
Figure 5:
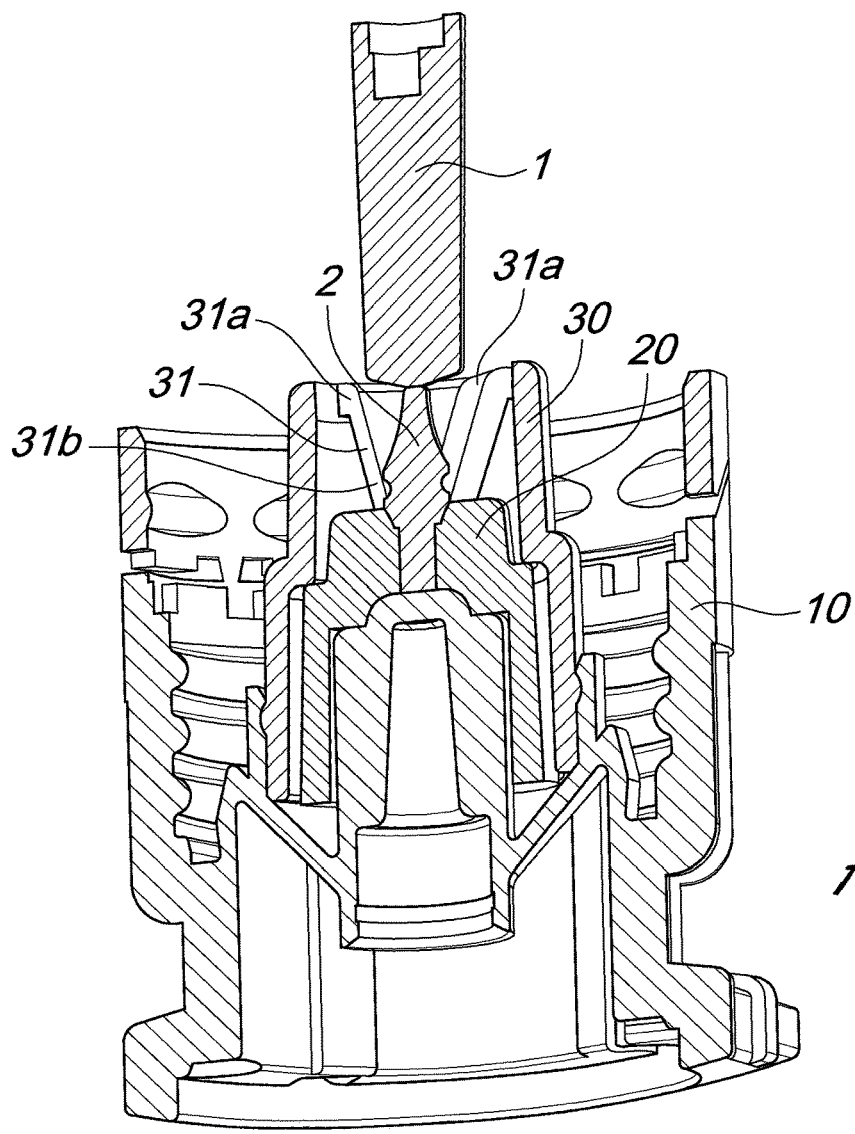
Figure 6A:
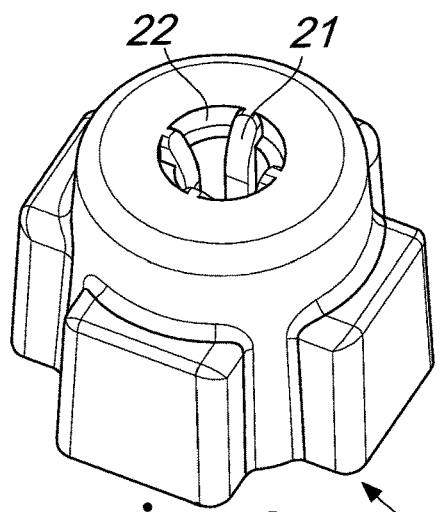
Figure 6B:
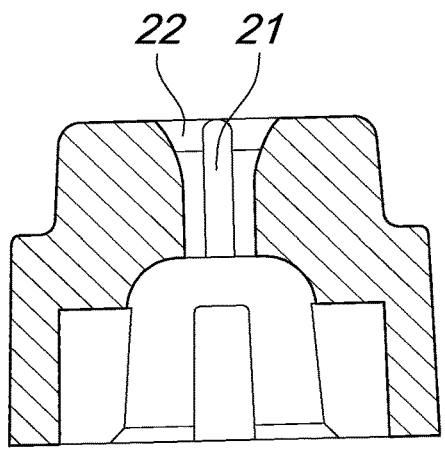
Figure 7A:
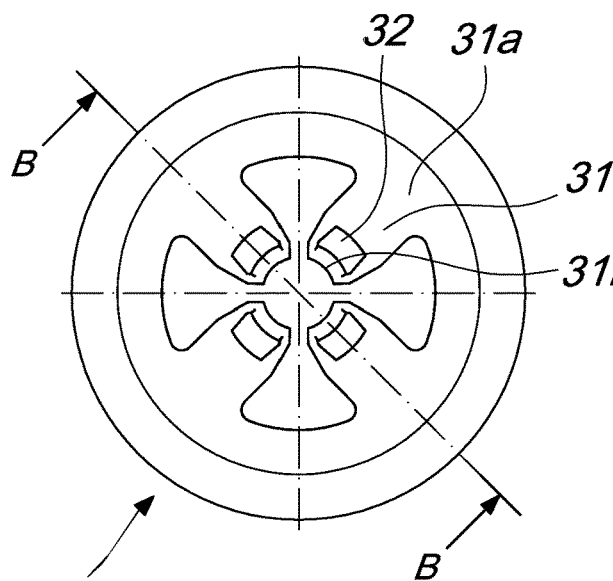
Figure 7B:
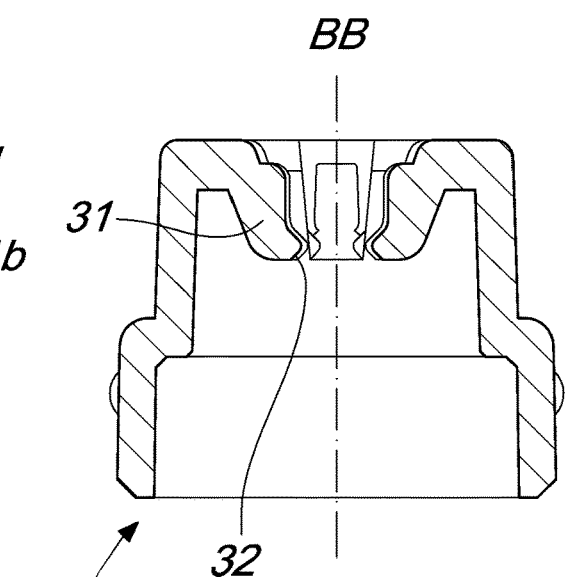
Figure 8:
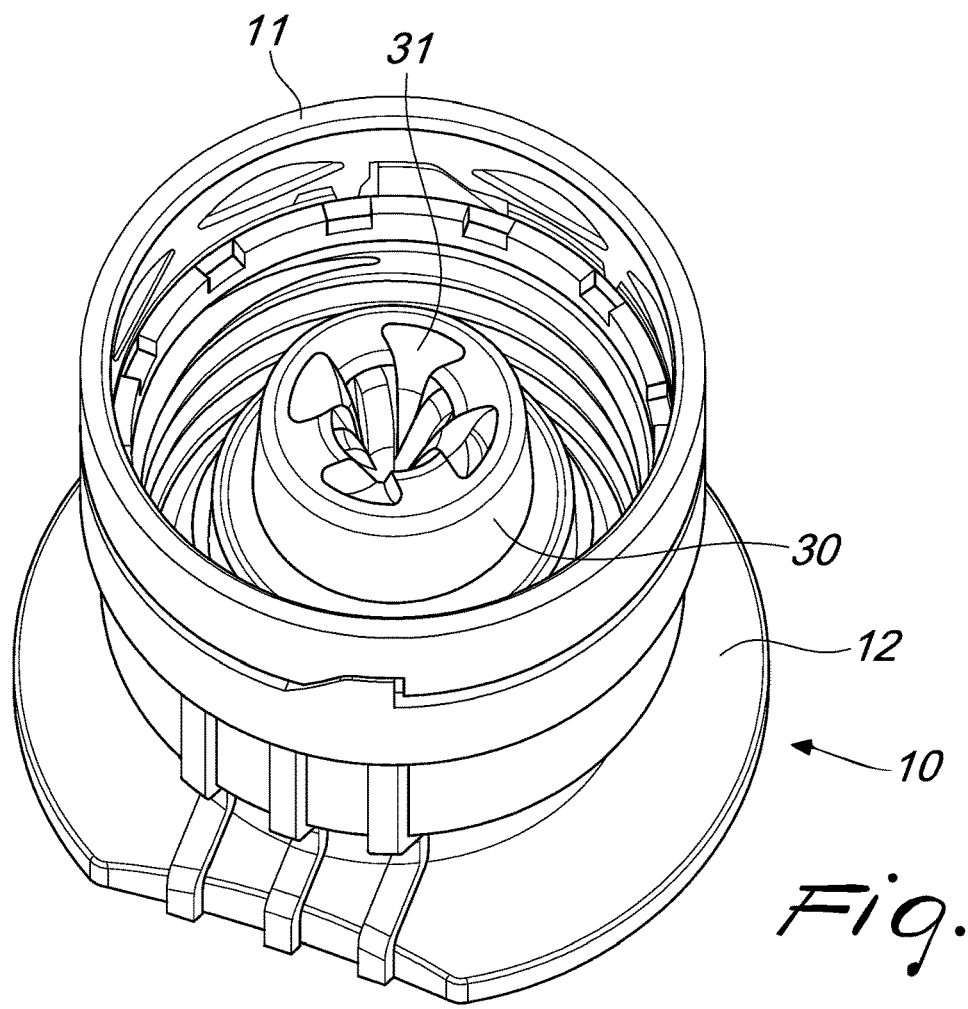

FIGS. 3a-c show three perspective views of a receptacle consisting of a bottom receptacle part with a cover, wherein the cover is shown connected to the bottom receptacle part in FIG. 3a, only the bottom receptacle part is shown open in FIG. 3b, and only the cover with the dental implant inserted therein is shown in FIG. 3c;

FIG. 4 shows the cover of FIG. 3 with an intermediate connecting element, a holder, a clip element as its components and the dental implant in a perspective exploded view;

FIG. 5 shows the cover with the dental implant inserted in it in a sectional side view;

FIGS. 6a and 6b show the holder of the cover for the dental implant in a perspective view and in a sectional side view, respectively;

FIGS. 7a and 7b show the clip element of the cover for the dental implant, in a top view and in a sectional side view, respectively;

FIG. 8 shows the cover with its components from the inside in a perspective view.

DETAILED DESCRIPTION OF EXEMPLARY EMBODIMENTS

Figure 1A:
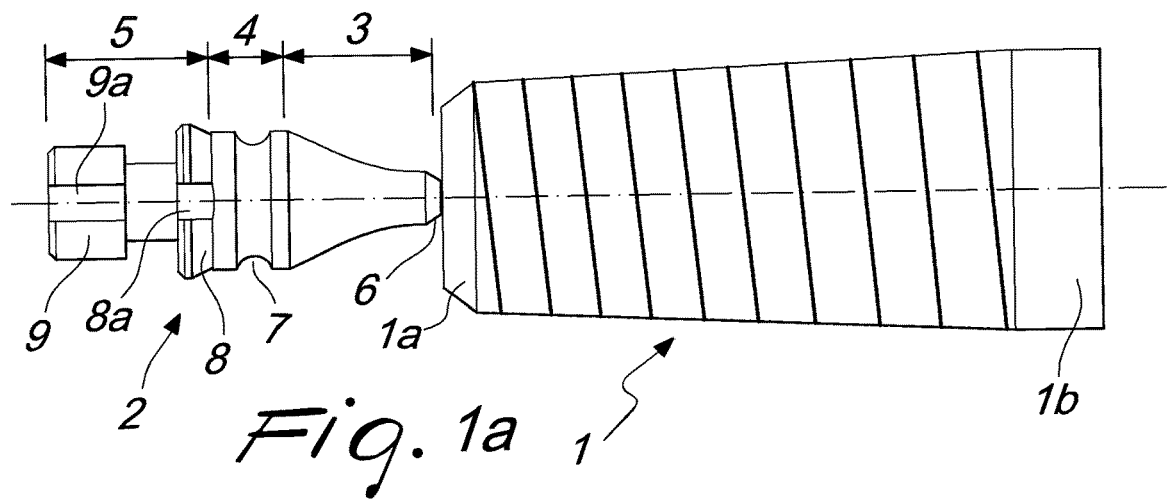
FIGS. 1a and 1b show a preferred first embodiment of a dental implant having an implant extension in a side view and in a sectional side view, respectively, said dental implant having an implant extension at an apical end.
Figure 1B:
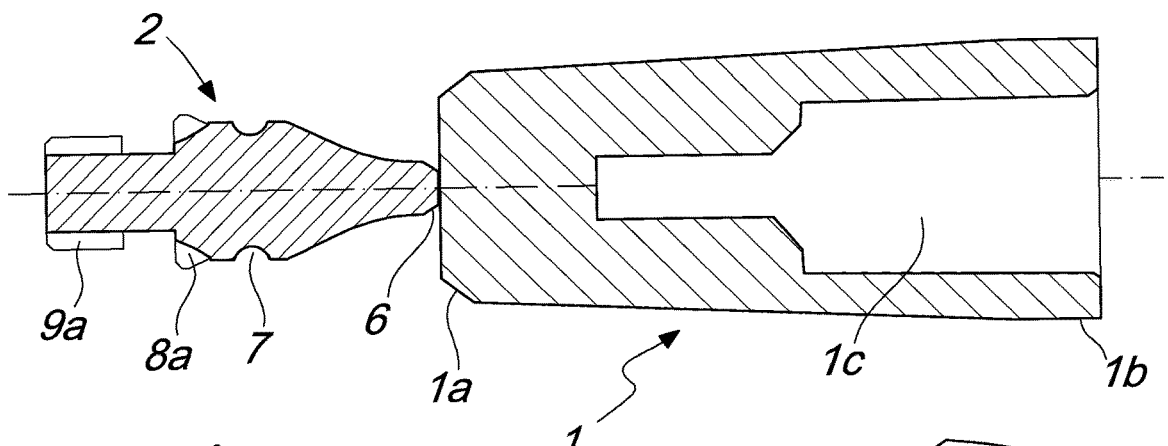
Figure 2A:
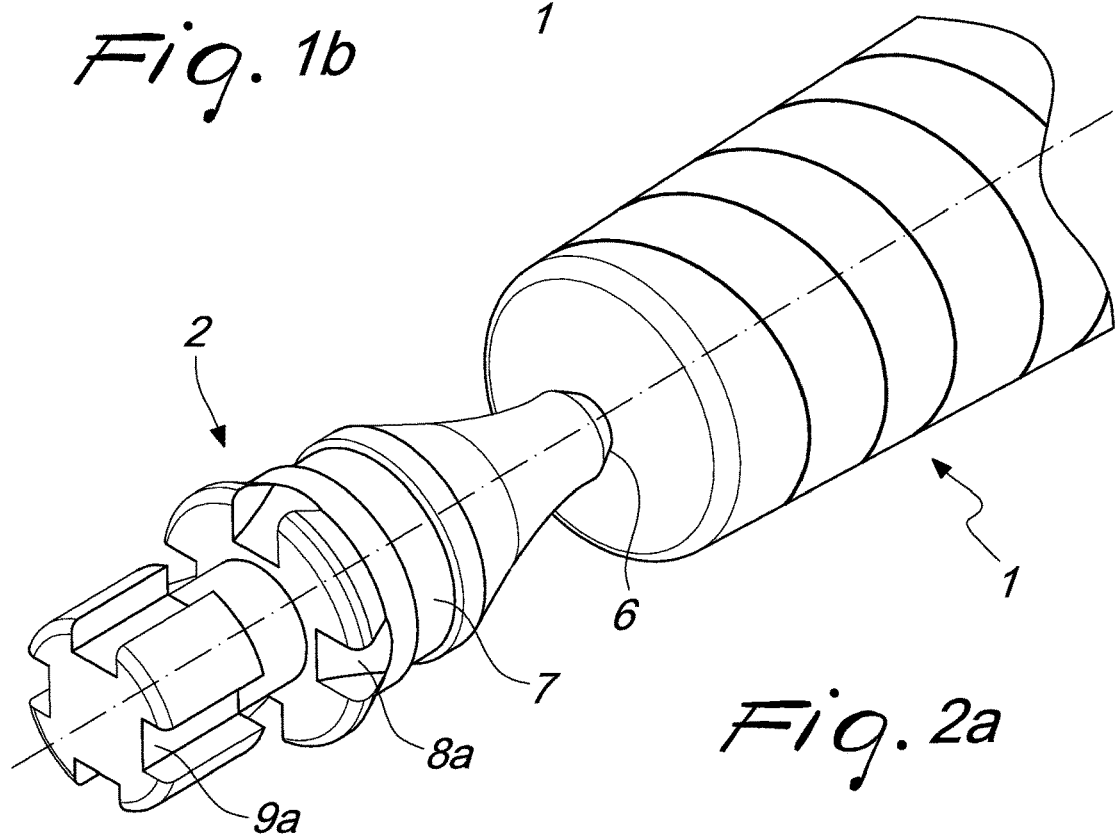
FIG. 2a shows the dental implant with the implant extension of FIG. 1 in a perspective view.

FIGS. 1a, 1b, and 2a show a first preferred exemplary embodiment of a dental implant 1 with an implant extension 2, which is formed along a longitudinal axis. FIGS. 3a-8 show a correspondent designed receptacle for holding and transporting the dental implant.

In general, the dental implant 1 with the implant extension 2 is designed along a longitudinal axis and as follows, wherein:
   a) the dental implant 1 comprises an apical end 1a, a coronal end 1b and a section 1c for receiving and securing an abutment; a connection of the dental implant with the abutment can be made both externally and internally; the section 1c also forms an adapter connection to a suitable tool,
   b) the implant extension 2 is formed in one piece with the implant 1 and extends away from one end face of the apical end 1a along the longitudinal axis,
   c) the implant extension 2 has a first section 3 along the longitudinal axis with an annular constriction 6, which is directly connected to the end face of the apical end 1a of the implant 1 and is designed as a predetermined breaking point with such a small material diameter that, in the event of bending or torsion of the implant 1 against the implant extension 2, the implant 1 breaks off from the implant extension 2 at the constriction 6,
   d) wherein according to the invention the implant extension 2 has along the longitudinal axis following the first section 3, a second section 4 and a splined shaft section 5, wherein the second section 4 and the splined shaft section 5 being further away from the implant 1 than the first section 3 and wherein the second section 4 having therein perpendicular to the longitudinal axis an outer annular groove 7 which is designed to hold the implant extension 2 by clamping the groove 7 in the direction of the longitudinal axis. The splined shaft section 5 is designed to hold the implant extension 2 in a secured manner against rotation around the longitudinal axis.

The implant extension 2 is designed in such a way that it can be inserted in a cover 10 of a receptacle which is a transport receptacle, in order to allow to hold and transport the dental implant 1 firmly in it by holding the implant extension 2. The receptacle or transport receptacle preferably comprises the cover 10 and a bottom receptacle part 14, as shown in FIGS. 3a-3c, for example, which can be tightly closed together and opened for removal of the dental implant 1. In the cover 10 preferably a channel is formed into which the implant extension 2 can be inserted and locked.

Preferably, the groove 7 is designed with at least one edge in such a way that for example spring arms 31 or holding elements of the cover 10, which must be elastic in the cover, can engage in the groove, wherein the spring arms 31 or holding elements form a barb function with the edge or groove. The edge is thus preferably formed at the apical end of the groove, against which the spring arms 31 or holding elements abut when the implant extension 2 is pulled back away from the cover 10, retaining the implant extension 2 in it. The edge is preferably also the outer edge of an annular surface extending perpendicular to the longitudinal axis in order to form the barb function with the spring arms 31 or holding elements engaging therein. In this way the dental implant 1 can be securely inserted and held in the cover 10 and broken off when removing it from the cover 10 with the implant extension 2.

Preferably, in a coronal section of the splined shaft section 5, as shown in FIGS. 1a, 1b, and 2a, circular segment-like first wedges 8 are formed around the longitudinal axis, which are formed by first hubs 8a lying in between. Preferably also on an apical outer section of the splined shaft section 5, as shown, second circular segment-like wedges 9 are formed around the longitudinal axis, which are formed by second hubs 9a laying in between. Preferably a second groove is formed along the longitudinal axis between the first wedges 8 and the second wedges 9, which can also serve to allow other spring arms or similar holding elements of a cover or part thereof to snap into it. The first wedges 8 and the second wedges 9 are designed to withstand a greater torsional torque than, that that is necessary to separate, break off or twist off the dental implant 1 from the implant extension via the predetermined breaking point 6.

Figure 2B:
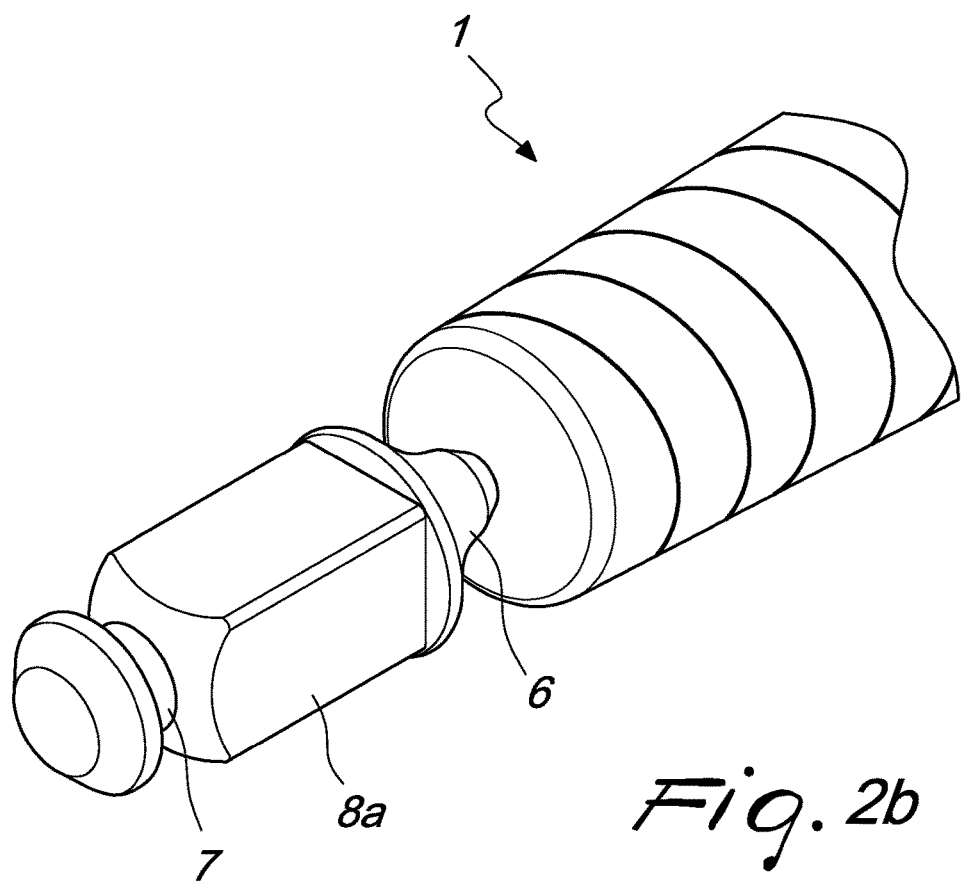
FIG. 2b shows a preferred second embodiment of the dental implant with a different implant extension in a perspective view.
Figure 2C:
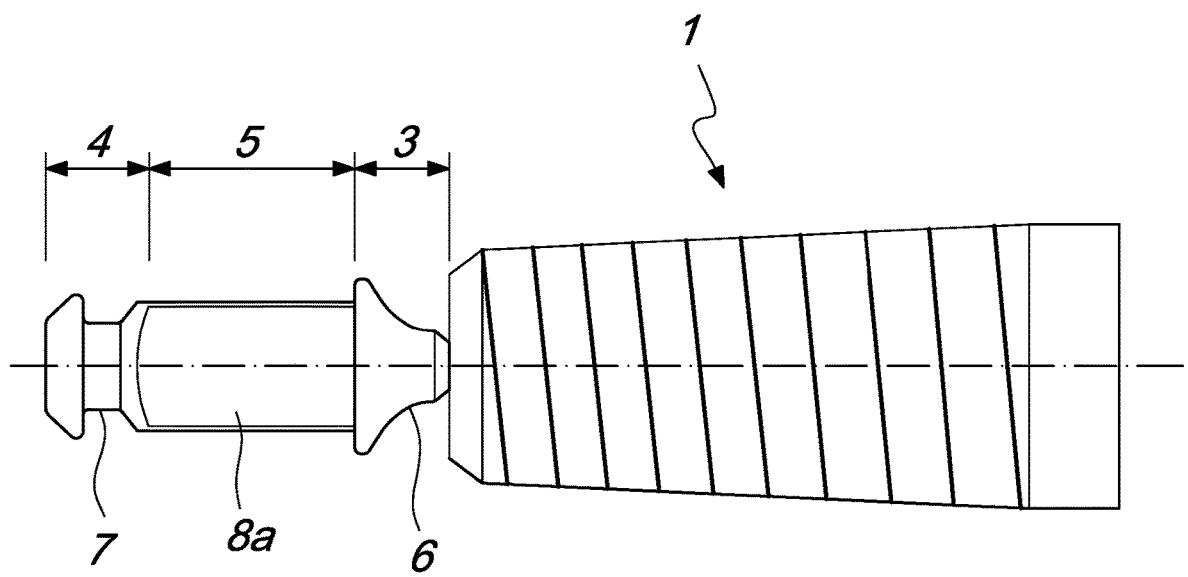
FIG. 2c shows the preferred second embodiment of the dental implant with a different implant appendix in a side view.

FIGS. 2b and 2c show a second preferred embodiment of the dental implant 1 with a different implant extension 2, wherein the splined shaft section being formed therein by being designed in the shape of a square bar and thus forming an anti-rotation feature in conjunction with the holder 20 as a corresponding counterpart. For the sake of clarity, the term anti-rotation section could also be used as a generic term instead of the term splined shaft section, wherein the anti-rotation section having the feature of being merely not circular or rotationally symmetrical. The splined shaft section 5 or anti-rotation section is preferably provided with notches or protuberances or with plane sections. In other words, the splined shaft section 5 has, along the longitudinal axis and around the longitudinal axis, at least one lateral plane section or at least one splined shaft section as a groove or as a protuberance in order to generate the anti-rotation feature with a corresponding counterpart. For the sake of clarity, the counterpart is the holder 20 of the cover 10. Possible cross-sectional shapes of the splined shaft section 5 or anti-rotation section could be a square or rectangular, a star-shaped or a torx-like shape.

Preferably the second section 4 is located along the longitudinal axis between the first section 3 and the splined shaft section 5. Alternatively, the splined shaft section 5 is located along the longitudinal axis between the first section 3 and the second section 4.

Preferably the material diameter of the constriction 6 is in a range, especially in the embodiment of FIG. 2a, between 0.4 mm and 0.8 mm or, especially in the embodiment of FIG. 2b or 2c, between 0.8 mm and 1.2 mm or, more preferably, it is less than 1.0 mm (especially in the embodiment of FIG. 2b or 2c) or less than 0.7 mm or less than 0.6 mm (especially in the embodiment of FIG. 2a).

Preferably, the material diameter of the constriction 6 is designed in such a way that the constriction 6 breaks at a torsion of less than 25 Ncm or less than 20 Ncm, or more preferably less than 10 Ncm or even more preferably less than 5 Ncm.

The dental implant 1 is preferably made of a biocompatible material such as titanium, a titanium alloy or ceramic such as zirconium oxide ceramic.

Preferably, the constriction 6 is designed so that the material diameter of the first section 3 increases continuously along the longitudinal axis beginning at the end face of the apical end 1a of implant 1.

Preferably, the material diameter of a first partial section of the first section 3 of the implant extension 2, which is directly adjacent to the end face of the apical end 1a, has an inclination relative to the longitudinal axis of less than 35° and preferably 31° to 25°.

Preferably, the dental implant 1 has threads between the apical end 1a and the coronal end 1b for screwing the dental implant 1 into a bone.

FIGS. 3a-8 show an exemplary embodiment of the receptacle and preferred parts thereof, which are suitable for holding and transporting the dental implant 1. If possible, the receptacle should be designed in such a way that the dental implant 1 with its implant extension 2 can be inserted, held and transported safely and easily without falling down or kinking. The dental implant 1 is inserted into the cover 10 and locked in it. It should also be possible to open the receptacle easily and remove the dental implant 1 out of it.

The receptacle may be designed to comprise the following:
- a) the cover 10 which is formed along the longitudinal axis with a first end section 11 which is open towards the outside in the direction of the longitudinal axis and with a second end section 12 which is closed towards the outside. The cover 10 surrounds an interior space 15 which is open to the first end section 11 and in which a holder 20 is arranged along the longitudinal axis, said holder having the channel which is open to the outside along the longitudinal axis, the channel being formed to at least partially receive the implant extension 2 and thus to hold the dental implant 1 during transport;
- b) the bottom receptacle 14 formed tubularly along the longitudinal axis with an outer third end section 14a and an opposing fourth end section 14b, the third end section 14a being tightly sealed to the outside;
- c) wherein the fourth end section 14b of the bottom receptacle 14 and the first end section 11 of the cover 10 being designed to be interconnectable and manually detachable to form a substantially gas tight and liquid tight space therebetween in which the dental implant 1 is located;
- d) wherein in the cover 10 towards the longitudinal axis the at least three spring arms 31 are formed and arranged in such a way that they are each connected to the cover 10 at an outer first end 31a along an annular region around the longitudinal axis and are equally spaced and resilient radially towards the longitudinal axis with a respective opposing second end 31b;
- e) wherein the second ends 31b towards the longitudinal axis each having a nub 32 formed to engage a groove 7 formed annularly on the implant extension 2 when the implant extension 2 is in its final position; and
- f) wherein the spring arms 31 are designed geometrically and so flexible that the nubs 32 are pushed away from the longitudinal axis during insertion of the implant extension 2 and, in the final position, push into the groove 7 with a clamping force perpendicular to the longitudinal axis.

Preferably, the holder 20 is connected to cover 10 in a rotationally fixed manner around the longitudinal axis, and the channel has a splined hub section or a second anti-rotation section along the longitudinal axis at least in sections. The splined hub section or the second anti-rotation section, as it could also be called, is designed in such a way that it forms the rotationally fixed anti-rotation connection with the splined shaft section or the anti-rotation section of the implant extension 2 in the final position. For the sake of clarity, the terms "splined shaft section" and "second anti-rotation section" are synonyms for each other in this document.

Preferably, the splined hub section has greater torsional stability to hold the splined shaft section of the implant extension 2 than is necessary to break off the implant 1 from the implant extension 2 by rotational movement around the longitudinal axis. The torsional stability between the splined hub section of the holder and the splined shaft section of the implant extension 2 is selected to ensure that the implant is held securely during transport and storage. In a well-known manner, the lower torque force required to separate the implant from the implant extension is selected in such a way that the security of the connection between the implant and the implant extension during transport and storage is ensured and, at the same time, no damage to the implant or its adapter occurs when the implant is separated.

As exemplary shown in FIGS. 6a and 6b, the holder 20 preferably has a splined hub section which is complementary to the splined shaft section 5 of the implant extension 2, wherein third hubs 22 of the holder 20 at least match the first wedges 8 of the implant extension 2 and third wedges 21 of the holder 20 at least match the first hubs 8a of the implant extension 2, wherein, however, preferably third hubs 22 of the holder 20 match the first wedges 8 and the second wedges 9 of the implant extension 2 and third wedges 21 of the holder 20 match the first hubs 8a and the second hubs 9a of the implant extension 2 in order to establish a rotationally fixed connection. As mentioned above, the splined hub section or the second anti-rotation section is complementary to the splined shaft section 5 or anti-rotation section of the implant extension 2.

Preferably, the torsional stability between the splined shaft section of the holder 20 and the splined shaft section of the implant extension 2 is greater than 25 Ncm or greater than 20 Ncm, preferably greater than 10 Ncm and particularly preferably greater than 5 Ncm, to ensure that the dental implant 1 can be safely broken off the implant extension 2 and the cover 10.

Preferably, the holder 20 is connected with the cover 10 in one piece. Alternatively, the holder 20 is connected to the cover 10 in two pieces or via at least one intermediate connecting element 13. Preferably, the holder 20 is designed as a bushing separate from the cover 10, which has a plug connection towards the cover 10, which can be pushed into one another along the longitudinal axis with the cover 10 and thereby forms a rotationally fixed connection. Preferably, the plug connection has a torsional stability that is higher than the torsional stability of the connection between the splined hub section of the holder 20 and the splined shaft section of the implant extension 2.

The plug connection between the holder 20 and the cover 10 preferably comprises the separate intermediate connecting element 13, which is formed along the longitudinal axis in such a way that when the two elements are plugged into each other along the longitudinal axis, a rotationally fixed connection to the holder 20 is formed at one end section and a rotationally fixed connection to the cover 10 is formed at an opposing end section. The intermediate connecting element 13 can have an adapter function, in order to be able to connect different holders 20, which match a respective dental implant 1, to the cover 10, for example. FIG. 4 shows such an intermediate connecting element 13, which is arranged between the cover 10 and the holder 20 and connects them. The connection via the intermediate connecting element 13 is preferably a rotationally fixed connection and/or preferably a tension-resistant connection. Preferably, the intermediate connecting element 13 can also be formed elastically in order to absorb shocks in the longitudinal direction along the longitudinal axis.

Preferably, the at least three spring arms 31 are designed in one piece as a clip element 30, which is formed around the longitudinal axis, as shown in FIGS. 7a and 7b, for example. Particularly preferably, four spring arms 31 are formed in one piece as one clip element 30, which is formed around the longitudinal axis, as shown in FIGS. 7a and 7b, for example. The clip element 30 can be connected to the cover in the direction of the longitudinal axis in order to be connected to the cover 10 in a tension-resistant manner in a fitted, pushed on, latched and/or screwed state. In other words, the clip element 30 is preferably designed to form a direct connection to the cover 10, wherein the clip element 30 thereby fixes the holder 20 in the cover along the longitudinal axis.

Preferably, the cover 10, the holder 20 and the clip element 30 are formed in such a way that in the interior space 15 of the cover 10, first the holder 20 is inserted into the cover 10 and then the clip element 30 is placed on the holder 20 and connected to each other. Preferably, the clip element 30 and the cover 10 are formed to hold the holder 20 between them on the cover 10 in the longitudinal direction.

Preferably, the cover 10, the intermediate connecting element 13, the holder 20 and the clip element 30 are formed in such a way that in the interior space 15 of the cover 10, first the intermediate connecting element 13 is inserted into the cover 10, then the holder 20 onto the intermediate connecting element 13 and then the clip element 30 onto the holder 20 and connected to each other.

Preferably, the clip element 30 is made of a more flexible material than the holder 20 and/or is designed with a flexible geometry, for example by means of slots or spring-armed webs, as shown exemplary in FIGS. 7a and 7b.

Preferably, the second end section 12 has a non-circular grip surface on the outside in order to be able to manually hold and turn the cover 10 on it so that it is non-slip and can be safely released from the bottom receptacle 14.

Preferably, the channel in the holder 20 for holding the implant extension 2 is designed to be at least so stable that it can withstand at least one bending moment by the implant extension 2 in the final position, which occurs when implant 1 is separated from implant extension 2 by a bending break-off. According to the invention, the term "separable" or "separating" includes any type of separating, such as by breaking off or twisting off.

For the sake of clarity, the features "above" and "below" are understood to mean relative locations in a vertical direction, as shown in the figures. Apical refers to a position that is located on the bone and further away from the abutment or tooth attachment than a coronal end. Sometimes apical is also understood to be distal and coronal is understood to be proximal to the dentist, in the case of an inserted dental implant 1.

Other possible embodiments are described in the following claims. In particular, the various features of the embodiments described above can also be combined with one another, provided they are not technically mutually exclusive.

The reference signs mentioned in the text above and in the claims serve only for better comprehensibility and do not limit the claims in any way to the shapes represented in the figures.

LIST OF REFERENCE SIGNS 1 dental implant
1a apical end
1b coronal end
1c adapter connection
2 implant extension (appendix)
3 first region
4 second region
5 splined shaft section
6 constriction
7 groove
8 first wedges (preferably circular segments)
8a first hubs
9 second wedges
9a second hubs
10 cover
11 first end section
12 second end section
13 intermediate connecting element
14 bottom receptacle
14a third end section
14b fourth end section
15 interior space
20 holder for the implant
21 third wedges
22 third hubs
30 clip element
31 spring arm
31a outer first end
31b outer second end
32 nub (or nose-like bulge)

The invention claimed is:

1. A dental implant with an implant extension which are formed along a longitudinal axis, the dental implant comprising:
    an apical end, a coronal end, and a section including a bore for receiving and securing an abutment;
    the implant extension being formed in one piece with the implant and extending away from an end face of the apical end along the longitudinal axis,
    the implant extension including:
        a first section along the longitudinal axis with an annular constriction, which is directly connected to the end face of the apical end of the implant and is designed as a predetermined breaking point with such a small material diameter that, in the event of bending or torsion of the implant against the implant extension, the implant breaks off from the implant extension at the annular constriction, and
        a second section and a splined shaft section arranged along the longitudinal axis following the first section, the second section and the splined shaft section being further away from the implant than the first section, wherein:
    the second section includes therein perpendicular to the longitudinal axis an outer annular groove that is designed to be clamped in the direction of the longitudinal axis to hold the implant extension in a receptacle or a receptacle cover, and
    the splined shaft section is designed to be held in the receptacle or the receptacle cover to secure the implant extension against rotation around the longitudinal axis.

2. The dental implant with the implant extension according to claim 1, wherein the second section is located along the longitudinal axis between the first section and the splined shaft section.

3. The dental implant with the implant extension according to claim 1, wherein the splined shaft section is located along the longitudinal axis between the first section and the second section.

4. The dental implant with the implant extension according to claim 1, wherein the material diameter of the annular constriction is between 0.4 mm and 0.8 mm.

5. The dental implant with the implant extension according to claim 1, wherein the material diameter of the annular constriction is between 0.8 mm and 1.2 mm.

6. The dental implant with the implant extension according to claim 1, wherein the material diameter of the annular constriction is designed in such a way that the annular constriction breaks at a torsion of less than 25 Ncm.

7. The dental implant with the implant extension according to claim 1, wherein the annular constriction is designed in such a way that the material diameter of the first section increases continuously along the longitudinal axis beginning at the end face of the apical end of the implant.

8. The dental implant with the implant extension according to claim 7, wherein the material diameter of a first partial section of the first section of the implant extension, which is directly adjacent to the end face of the apical end, has an inclination relative to the longitudinal axis of less than 35°.

9. The dental implant with the implant extension according to claim 1, wherein the dental implant includes threads between the apical end and the coronal end for screwing the dental implant into a bone.

10. The dental implant with the implant extension according to claim 1,
    wherein the groove is formed to the outside with at least one edge in such a way that elastic spring arms or similar holding elements of the receptacle cover, which comprises a channel into which the implant extension can be inserted, can engage the groove, in order to clamp the implant extension in the channel,
    wherein the edge at the same time delimits an annular surface extending perpendicular to the longitudinal axis, in order to form a barb function with the spring arms or similar holding elements engaging the groove.

11. The dental implant with the implant extension according to claim 1, wherein the splined shaft section includes along the longitudinal axis and around the longitudinal axis at least one lateral plane section or at least one splined shaft section as a groove or as a protuberance in order to produce the anti-rotation lock with a corresponding counterpart.

12. A method for transporting the dental implant with the implant extension according to claim 1, the method comprising holding the dental implant through the apical end during transport.

13. A method comprising apically holding the dental implant with the implant extension according to claim 1 in a transport receptacle.

14. The method according to claim 13, wherein the implant is held exclusively apically in the transport receptacle or in the cover of the transport receptacle.

15. The dental implant with the implant extension according to claim 1, wherein a coronal section of the splined shaft section includes circular segment-like first wedges extending along the longitudinal axis, the circular segment-like first wedges being formed by first hubs lying in between the circular segment-like first wedges.

16. The dental implant with the implant extension according to claim 15, wherein an apical outer section of the splined shaft section includes second circular segment-like wedges extending along the longitudinal axis, the second circular segment-like wedges being formed by second hubs laying in between the second circular segment-like wedges, wherein a second groove is formed along the longitudinal axis between the first wedges and the second wedges, the second groove being adapted for snap connection with spring arms or similar holding elements of the receptacle cover or part thereof.

17. The dental implant with the implant extension according to claim 16, wherein the first wedges and the second wedges are designed to withstand a greater torsional torque than a torsional torque that is necessary to separate, break off or twist off the dental implant from the implant extension via the predetermined breaking point.

18. The dental implant with the implant extension according to claim 1, wherein the material diameter of the annular constriction is designed in such a way that the annular constriction breaks at a torsion of less than 20 Ncm.

19. The dental implant with the implant extension according to claim 1, wherein the material diameter of the annular constriction is designed in such a way that the annular constriction breaks at a torsion of less than 10 Ncm.

20. The dental implant with the implant extension according to claim 1, wherein the material diameter of the annular constriction is designed in such a way that the annular constriction breaks at a torsion of less than 5 Ncm.

* * * * *